United States Patent
Tegeder et al.

(10) Patent No.: US 12,047,501 B2
(45) Date of Patent: Jul. 23, 2024

(54) SYSTEM AND METHOD FOR PROVIDING AN AUTHORISED THIRD PARTY WITH OVERT LEDGER SECURED KEY ESCROW ACCESS TO A SECRET

(71) Applicant: Roland Tegeder, London (GB)

(72) Inventors: Roland Tegeder, London (GB); Richard Sharp, London (GB)

(73) Assignee: ROLAND TEGEDER, London (GB)

( * ) Notice: Subject to any disclaimer, the term of this patent is extended or adjusted under 35 U.S.C. 154(b) by 172 days.

(21) Appl. No.: 15/996,336

(22) Filed: Jun. 1, 2018

(65) Prior Publication Data
US 2019/0372765 A1    Dec. 5, 2019

(51) Int. Cl.
H04L 29/06 (2006.01)
H04L 9/08 (2006.01)
H04L 9/14 (2006.01)

(52) U.S. Cl.
CPC .......... H04L 9/0897 (2013.01); H04L 9/0825 (2013.01); H04L 9/085 (2013.01); H04L 9/14 (2013.01)

(58) Field of Classification Search
None
See application file for complete search history.

(56) References Cited

U.S. PATENT DOCUMENTS

| | | | | |
|---|---|---|---|---|
| 2017/0262639 | A1* | 9/2017 | D'Souza | H04L 63/0428 |
| 2017/0279807 | A1* | 9/2017 | Bermúdez | H04L 9/0894 |
| 2018/0343120 | A1* | 11/2018 | Andrade | H04L 9/0637 |
| 2019/0342084 | A1* | 11/2019 | Mehedy | H04L 9/0825 |
| 2021/0211468 | A1* | 7/2021 | Griffin | H04L 63/20 |

FOREIGN PATENT DOCUMENTS

| | | |
|---|---|---|
| CN | 101436930 A | 5/2009 |
| CN | 104580250 A | 4/2015 |
| CN | 106603549 A | 4/2017 |
| CN | 107623569 A | 1/2018 |

(Continued)

OTHER PUBLICATIONS

Abelson et al.; "The risks of key recovery, key escrow, and trusted third-party encryption"; World Wide Web Journal 2, 3; 1997; p. 241-257.

(Continued)

*Primary Examiner* — Joseph P Hirl
*Assistant Examiner* — Chi D Nguy
(74) *Attorney, Agent, or Firm* — BakerHostetler (57) ABSTRACT

The present invention relates to a cryptographic protocol, and a system for implementing said protocol, for providing overt ledger secured key escrow access to encrypted data. The invention uses a plurality of trustee systems, each holding a secret share of a secret, to validate requests for the secret from authorised third parties. When a valid request is made, each trustee system publishes its secret share to a ledger. The secret shares can be combined to reveal the encryption key only by the authorised third party. Requests for the encryption key, and the responses by the trustee systems, can be accessed by the owner of the encryption key to identify the requesting third party and to have proof that the key has been revealed to the third party.

21 Claims, 3 Drawing Sheets

(56) References Cited

FOREIGN PATENT DOCUMENTS

| WO | WO 2017/151861 A1 | 9/2017 | | |
|---|---|---|---|---|
| WO | WO 2018/109010 | * 12/2017 | ............... | H04L 9/08 |

OTHER PUBLICATIONS

Ito et al.; "Secret sharing scheme realizing general access structure"; Electronics and Communications in Japan—part III; vol. 72 Issue 9; 1989; 4 pages.
A. Shamir; "How to share a secret:"; Communications of the ACM; vol. 22 Issue 11; 1979; 9 pages.
S. Nakamoto; "Bitcoin: A Peer-to-Peer Electronic Cash System"; UNICAMP-IA368; Nov. 2013; 30 pages.
S. Nakamoto; "Bitcoin: A Peer-to-Peer Electronic Cash System"; https:/bitcoin.org/bitcoin.pdf; accessed Aug. 24, 2018; 9 pages.
V. Buterin; "A Next Generation Smart Contract & Decentralized Application Platform"; Ethereum White Paper; 2014; 36 pages.
Schwartz et al.; "The Ripple Protocol Consensus Algorithm"; Ripple Labs Inc.; 2014; 8 pages.
S. Popov; "The Tangle"; 2016; 28 pages.
Peter Linder; "Decryption Contract Enforcement Tool (Decent): A Practical Alternative to Government Decryption Backdoors"; Int'l Association for Cryptologic Research; vol. 20160401:160351; Mar. 2016; p. 1-20.
Boyd et al.; "Key Recovery: Inert and Public"; Int'l Association for Cryptologic Research; vol. 20170314:231517; Mar. 2017; p. 1-20.

* cited by examiner

SYSTEM AND METHOD FOR PROVIDING AN AUTHORISED THIRD PARTY WITH OVERT LEDGER SECURED KEY ESCROW ACCESS TO A SECRET

BACKGROUND

Since at least Ancient Egyptian times, encryption has been used to enable secret communication between parties, and it is now widely used to protect information and control access to data of all kinds, whether such data are held by a single party or transmitted between parties. For example, encryption can be used to secure data held on a hard disk such that only a party with knowledge of the encryption key can access the data, or to secure messages that are transmitted over the internet between two parties such that a third party, without access to the encryption key, cannot learn the contents of the messages even if they have access to the data that were transmitted between the parties.

While the use of encryption has solved many problems associated with ensuring the security of information, it has also created new ones. For example, a law enforcement body may wish to gain access to encrypted communication between two parties in order to solve or prevent a crime, or a person may die, or become otherwise incapacitated, rendering potentially important data on an encrypted disk inaccessible even to legally authorised parties. These problems have led many to call for the introductions of so-called "backdoors" into encryption algorithms. Backdoors provide a method of by-passing the requirement for a third party to know the encryption key in order to access encrypted data. However, while backdoors may enable an authorised third party to access the encrypted data, they can also be exploited by unauthorised and malicious third parties in order to gain covert access to the data. Furthermore, there is no way for the owner of the encrypted data to know whether the backdoor has been used to access encrypted data, either by an authorised or unauthorised third party. Existing backdoors into encryption algorithms may therefore compromise the security provided by the encryption in an unacceptable manner.

Existing systems allow the password or access layer of software to be programmed to allow for a third party to access some data with a different password to the one used by the owner of that data. However, any such system requires that the party that controls the system be "trusted", and the use of such trusted authorities comes with its own set of problems. In particular, a trusted authority has the option (either at will or involuntarily) to act against the interests of the data owner. Furthermore, there is no effective way of verifying whether the trusted authority has acted or acts in the interests of the data owner.

Other previous attempts to solve this problem include so-called "key escrow" systems. A key escrow system is a system in which the keys that are required to decrypt some encrypted data are held in escrow so that an authorised or designated third party may gain access to those keys under certain conditions. Verifying that any such conditions are met poses several problems. Existing key escrow systems rely on the correct functioning of some social linkage, such as a court order together with its verification and technical enforcement, or a connected individual or institutional body charged with controlling access to the key. As such, these systems still require an element of socially or institutionally founded trust in order to function correctly. The limitations and drawbacks of existing key escrow mechanisms are described in more detail in "*The risks of key recovery, key escrow, and trusted third-party encryption*" Hal Abelson et al. (1997), World Wide Web J. 2, 3 (June 1997), 241-257.

There is a need for a cryptographic protocol that enables authorised third parties to access encrypted information in a way that does not compromise the security of the underlying information and that provides the owner of the encrypted information with an inevitable, overt, persistent and secure record that the information has been accessed by the authorised third party so that illegal, unwarranted, inappropriate or otherwise unauthorised access can dealt with through the courts or other social channels.

SUMMARY OF THE INVENTION

According to a first aspect of the present invention, a system for providing access to a designated third party system to a secret is provided. The system comprises a plurality of trustee systems, and each trustee system is configured to receive a secret share of the secret from a first party system and store the secret share. Either the secret or the secret share is encrypted such that only a designated third party system can access the secret. Each trustee system is also configured to monitor published requests for the secret shares, validate that a given request for the secret shares was made by the designated third party system and, if the validation is successful, publish the secret share in response to the validated request for the secret shares.

Each published request for the secret shares may comprise a validation token and an encrypted validation token, and each trustee system may be further configured to receive a second key of a validation key pair from the first party system along with the secret share and store the second key of the validation key pair, validate that the request for the secret shares was made by the designated third party system by decrypting the encrypted validation token using the second key of the validation key pair and comparing the decrypted validation token with the validation token and, if the validation token of the validation message matches the decrypted validation token, publish the associated secret share.

Alternatively, each request for the secret shares may comprise an encrypted validation token, and each trustee system may be further configured to receive a second key of a validation key pair from the first party system along with the secret share and store the second key of the validation key pair, receive a validation token from the first party system and store the validation token, and validate that the request for the secret shares was made by the designated third party system by decrypting the encrypted validation token using the second key of the validation key pair and comparing the decrypted validation token with the validation token that was received from the first party system.

Each secret share may also pertain to a share of an identifier associated with the third party system such that the identifier can be derived from the secret shares. Alternatively, each trustee system may be further configured to receive an identifier associated with the third party system from the first party system along with the secret share and publish the identifier associated with the third party system along with the secret share.

The system may further comprise the first party system, and the first party system may be configured to encrypt the secret, generate the secret shares of the encrypted secret, and transmit the secret shares to the plurality of trustee systems. Alternatively, the first party system may be configured to generate the secret shares of the secret, encrypt the secret shares, and transmit the encrypted secret shares to the plurality of trustee systems.

The first party system may be configured to encrypt the secret or secret shares using a public encryption key associated with the third party system, or the first party system may be configured to encrypt the secret or secret shares using the second validation key of the validation key pair, such that the key required to decrypt the encrypted secret or encrypted secret shares is the first validation key of the validation key pair.

The secret itself may be a second object key of an object key pair, and the first party system may be further configured to encrypt data using the first object key of the object key pair, and transmit the encrypted data to the third party system.

The first party system may be further configured to generate a validation token, transmit the validation token to the plurality of trustee systems and transmit the validation token to the third party system.

The first party system may be further configured to select the plurality of trustee systems from a group of available trustee systems, such that the plurality of trustee systems is a subset of the larger group of available trustee systems.

The first party system may be further configured to analyse a request for secret shares by decrypting the encrypted validation token using the second key of the validation key pair and comparing the decrypted validation token with the validation token of the validation message and, if the validation token of the validation message matches the decrypted validation token, determine that the request for the secret shares was published by the designated third party system.

Alternatively, when a shared validation token is generated by the first party and provided to the trustee system, the first party system may be further configured to analyse the request for secret shares by decrypting the encrypted validation token using the second key of the validation key pair and comparing the decrypted validation token with the shared validation token held by the first party system. If the validation token held by the first party system matches the decrypted validation token, the first party determines that the request for the secret shares was published by the designated third party system.

The system may further comprise a third party system, which is configured to publish the request for the secret shares, monitor the plurality of published secret shares, validate the secret shares published by the plurality of trustee systems in response to the request for the secret shares, reassemble the encrypted secret from the published secret shares, and decrypt the encrypted secret.

Alternatively, when the secret shares rather than the secret are encrypted, the third party system may be configured to publish the request for the secret shares, monitor the plurality of published secret shares, validate the secret shares published by the plurality of trustee systems in response to the request for the secret shares, decrypt the encrypted secret shares from the published secret shares, and reassemble the secret from the decrypted secret shares.

The third party system may be further configured to decrypt the encrypted secret or secret shares using the private key of the key pair associated with the third party system or, when the secret is encrypted with second key of the validation key pair, decrypt the encrypted secret or secret shares with the first validation key of the validation key pair.

When the secret is a first key of an object key pair, the third party system is further configured to receive the encrypted data from the first party system, and decrypt the encrypted data using the decrypted second object key of the object key pair.

The third party system may be further configured to validate the secret shares published in response to the request for the secret shares by comparing the decrypted second validation token published with the secret shares to a local copy of the second validation token, such that when the decrypted second validation token matches the local copy of the second validation token, the third party system retrieves the associated secret share.

Each trustee system may be further configured to generate a second validation token, encrypt the second validation token using the second validation key of the validation key pair to generate an encrypted second validation token, and publish the second validation token and the encrypted second validation token with the secret share. In this case, the third party system is further configured to validate the secret shares published in response to the request for the secret shares by decrypting the encrypted second validation token using the first validation key of the validation key pair, comparing the decrypted second validation token with the second validation token and retrieving the associated secret share when the decrypted second validation token matches the second validation token.

According to a second aspect of the invention, a method for giving to a designated third party system access to a secret is provided. The method comprises receiving, at a trustee system, a secret share of the secret from a first party system and storing the secret share, wherein the secret or the secret share is encrypted such that only a designated third party system can access the secret, monitoring published requests for the secret shares, validating that a request for the secret shares was made by the designated third party system, and if the validation is successful, publishing the secret share in response to the validated request for the secret shares. It will be appreciated that the method may also include steps corresponding to all of the claimed features of the trustee, first party and third party systems set out above.

According to a third aspect of the invention, a computer-readable medium is provided. The computer-readable medium comprises instructions which, when executed by a computer, cause the computer to carry out the method described above.

DETAILED DESCRIPTION

The system and method of the present invention enable a first party to provide overt ledger secured key escrow ("OLSKE") access to a secret p, controlled by the first party, to a designated third party. In this context, "overt ledger secured key escrow access" means that access to the secret p is provided such that apart from the first party only the designated third party can access the secret p, and such that the designated third party's access is necessarily visible to the first party, i.e. that the third party's access to the secret p is necessarily overtly recorded with the effect that the first party, at least, is able to determine that the third party has accessed the secret p. In the present context, the term "designated third party" or "designated third party system" means that the third party or the third party system has overtly recorded access to the encryption keys required to successfully request and obtain access to the secret p.

Figure 1:
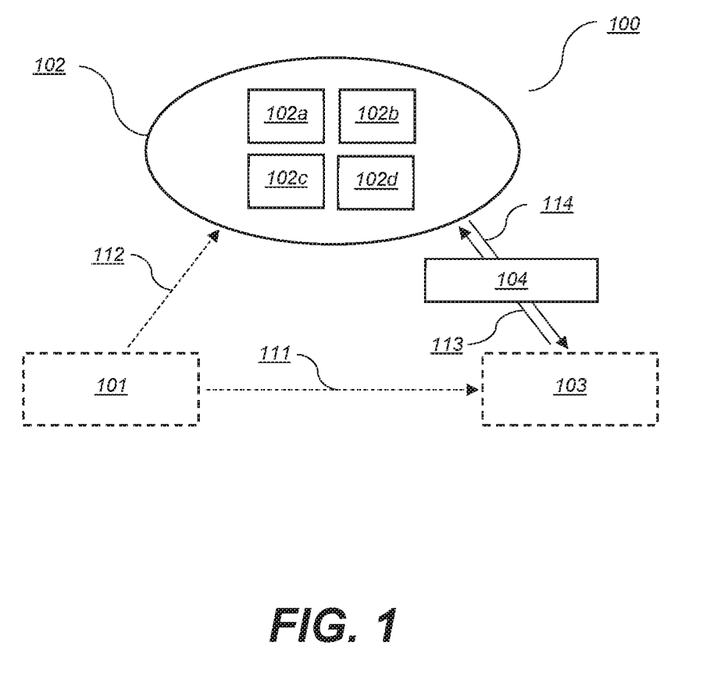
FIG. 1 is a high-level depiction of the system of the present invention.
Figure 3:
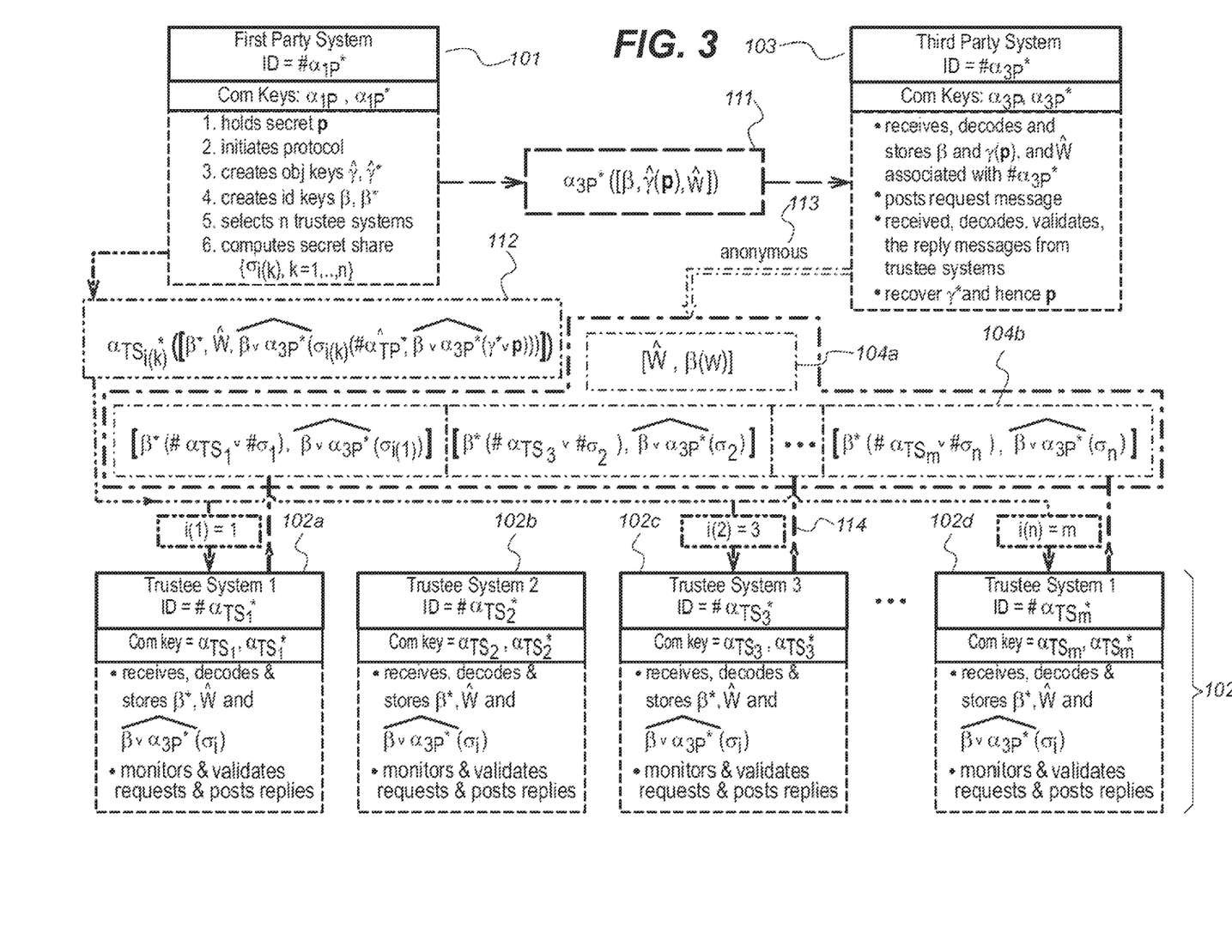
FIG. 3 depicts the overall system and method of the present invention in more detail.

FIG. 1 shows an overall depiction of the system 100 of the present invention, which is capable of providing this OLSKE access to an encrypted secret to a third party that has been designated for such access by the first party, i.e. the original owner/creator/controller of the secret p. FIG. 3 also shows an overall depiction of the system 100, in more detail, and in accordance with a preferred embodiment of the invention. Within FIG. 3, the notation AvB indicates that either A or B may be used, and the notation $\hat{C}$ indicates that feature C (and elements that C operates on) is optional.

The secret p is encrypted using a first key $\gamma$ of an asymmetric key pair, $\gamma$, $\gamma^*$, referred to as the object key pair. The second key $\gamma^*$ of the object key pair $\gamma$, $\gamma^*$ can be used to decrypt the encrypted secret $\gamma(p)$ in order to reveal the secret p. Secret p may be, for example, a password, encryption key, or indeed any other data that the first party wishes to keep secret. Where the secret p is an encryption key or password, the secret p may be used to encrypt or otherwise control access to further data, such as a user account for an online service for accessing an electronic device such as a personal computer. The process set out herein may be automatically repeated whenever the secret p changes, for example if p is a password or encryption key used to access an account or some other data, in order to maintain the ability of the designated third party to access the data if necessary. The first party may either use the system voluntarily and for personal reasons, or may be required to do so by law, by the configuration of a device/software, or by terms and conditions of the use of a service, for example.

The system 100 includes a plurality of trustee systems 102, each of which may be a server or other general purpose computer system, a virtual machine, or any other hardware or software element capable of performing the functions described herein. Some or all of the trustee systems 102a-d comprise a memory in which a secret share $\sigma_i$ pertaining to the second object key $\gamma^*$, which can be used to decrypt the secret p, is stored.

The secret shares $\sigma_i$ are part of a k, n secret sharing scheme, which works by splitting a secret s into a collection of secret shares $\sigma_i(s)$, for i=1, . . . , n. The secret s can be recovered from the secret shares $\sigma_i$ by combining a minimum number k of the secret shares $\sigma_i$, where k≤n. The secret s cannot be recovered from fewer than k secret shares $\sigma_i$. Examples of secret sharing schemes can be found in "*Secret sharing scheme realizing general access structure*", Ito, M., Saito, A. and Nishizeki, T. (1989), Electron. Comm. Jpn. Pt. III, 72: 56-64, and "*How to share a secret*", Shamir, A. (1979) Communication of the ACM, 22, pp. 612-613.

In the present system, the secret s that is split into the secret shares $\sigma_i$ includes at least the second object key $\gamma^*$, or an encrypted version of the second object key $\gamma^*$, as described in more detail below. The secret shares $\sigma_i$ may also include further data relating to the second object key $\gamma^*$, such as an identifier associated with the third party, also described in more detail below.

Each trustee system 102a-d monitors a ledger 104 for request messages 113 that indicate a request for access to the second object key $\gamma^*$. It will be appreciated that the system 100 may be used by more than one first party and more than one third party to provide OLSKE access to different secrets, and that each trustee system 102a-d may hold multiple secret shares, each pertaining to a share of a different object key corresponding to different secrets. As such, each trustee system 102a-d attempts to validate the request messages published to the ledger in order to find request messages that are relevant to the secret shares that the trustee system 102a-d holds. If the validation is successful, the trustee system 102a-d publishes a response message 114 that includes its secret share $\sigma_i$. The response messages 114 may be published to the same ledger 104 to which the request message 113 was published. Alternatively, the response messages 114 may be published to a different ledger.

Once a sufficient number, i.e. k out of n, of the trustee systems 102a-d have published their stored secret shares $\sigma_i$, the k published secret shares $\sigma_i$ can be combined so that the party which filed the request message 113 gains access to the second object key $\gamma^*$. In order to prevent collusion by the trustee systems or a Sybil attack from revealing the second object key $\gamma^*$ maliciously in order to compromise the system 100 as a whole, and in order to allow the secret shares $\sigma_i$ to be published publicly on a need-to-know basis, the second object key $\gamma^*$ may therefore be encrypted using a public key $\alpha_{3P}^*$ that is associated with the third party. Since the private key $\alpha_{3P}$ is then required to decrypt the second object key $\gamma^*$, only the third party can recover the second object key $\gamma^*$ from the reassembled secret shares $\sigma_i$. Alternatively, the second object key $\gamma^*$ may be encrypted with the second validation key $\beta^*$ of the validation key pair $\beta$, $\beta^*$ (described in more detail below) by the first party system 101 before the encrypted second object key, i.e. $\beta^*(\gamma^*)$, is split into the secret shares $\sigma_i$ and the secret shares $\sigma_i$ and second validation key $\beta^*$ are transmitted to the trustee system 102. In this way, the trustee systems are unable to access the second object key $\gamma^*$ in the event of collusion since they do not hold the first validation key $\beta$ that is required to decrypt either the second object key $\gamma^*$, as the case may be.

As a further alternative, the secret shares $\sigma_i$, rather than the second object key $\gamma^*$, may be encrypted using either the third party's public key $\alpha_{3P}^*$ or the second validation key $\beta^*$. In this way, only the designated third party would be able to reassemble the secret shares $\sigma_i$ to reveal the second object key $\gamma^*$ since they must be decrypted using either the third party's public key $\alpha_{3P}$ or the first validation key $\beta$ first.

It will be appreciated that the system would still function for providing OLSKE access to the secret p if the secret p itself, rather than the second object key $\gamma^*$, were split into the secret shares $\sigma_i$ that are distributed to the trustee systems, assuming in this case, however, that the secret p or the secret shares $\sigma_i$ themselves are either encrypted with the second validation key $\beta^*$ or the third party public key $\alpha_{3P}^*$ so that the secret p would not become public knowledge after publication of a sufficient number of response message 114. However, if p is large, each secret share $\sigma_i$ of p will also be large in many secret sharing schemes. Indeed, in a k, n secret sharing scheme, each of the n secret shares $\sigma_i$ is generally at least the size of the secret p itself. Thus, by controlling access to the secret p via the second object key $\gamma^*$, as described herein, the size of each secret share $\sigma_i$ and thus the amount of storage space occupied by the secrets shares in the memory of the trustee systems is reduced. The use of the object key pair $\gamma$, $\gamma^*$ also offers a layer of protection against collusion by the trustee systems in case the third party's private key $\alpha_{3P}$ is compromised. In this scenario, collusion amongst the trustee systems may reveal the second object key $\gamma^*$, but since the trustee systems do not also have access to the encrypted secret $\gamma(p)$, the secret p remains secure. Furthermore, since new object keys $\gamma$, $\gamma^*$ are generated for each secret p, even if a given object key pair $\gamma$, $\gamma^*$ is compromised, only the associated secret p is affected.

Also depicted in FIG. 1 is a first party system 101 and a third party system 103 that is designated by a first party to be provided with OLSKE access to the secret p. The function of the first party system and third party system is explained in more detail below with respect to FIGS. 2 and 3, which show a flow chart of a method 200 in accordance with the present invention and an overall system diagram 300 in accordance with the present invention respectively. It will be appreciated that while certain advantages are attributable to the functions of the first party system 101 and third party system 103 and the additional functions of the trustee systems 102a-d set out below, the core of the present invention is provided by the trustee systems 102. These features of the first party system 101 and third party system 103 are therefore exemplary and need not be implemented in order for the system and method of the invention to function.

Figure 2:
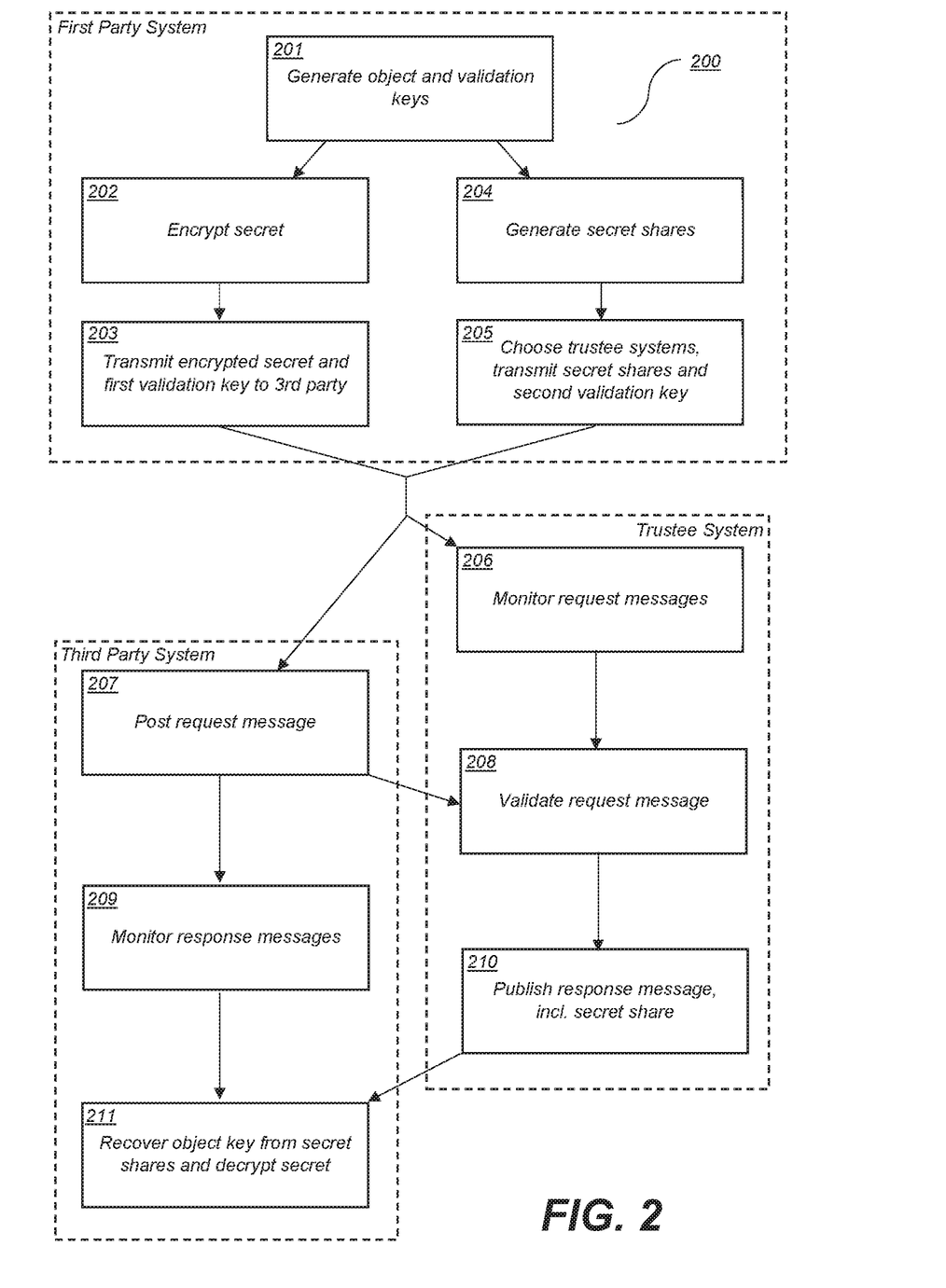
FIG. 2 shows a flow diagram depicting a method in accordance with the present invention.

At step 201 of the method 200 shown in FIG. 2, the first party system 101 generates two pairs of asymmetric encryption keys: the object key pair $\gamma$, $\gamma^*$ and a validation key pair $\beta$, $\beta^*$. The first party system 101 may be a personal computer, laptop, tablet, or indeed any other electronic device capable of carrying out the functions set out below.

At step 202, the first party system encrypts the secret p using the first object key $\gamma$ of the object key pair to generate the encrypted secret $\gamma(p)$. Controlling access to the secret p via the object key pair $\gamma$, $\gamma^*$ has numerous advantages; however, as explained above, the present system also functions when the secret p is directly split into the secret shares $\sigma_i$.

At step 203, the first party system 101 securely sends a message 111 to the third party system 103. The message includes a first validation key $\beta$ of the validation key pair $\beta$, $\beta^*$ and the encrypted secret $\gamma(p)$. The third party system 103 stores this message 111 securely for future use. Note that at this stage of the method the third party system 103 does not have access to the first party's secret p since it remains encrypted by the first object key $\gamma$. In the event that the secret p itself is split into the secret shares $\sigma_i$, rather than the second object key $\gamma^*$, it will be appreciated that the secret p should not form part of the message 111 that is transmitted to the third party. The message 111 that is transmitted to the third party may further include an indication of the secret sharing scheme that has been used by the first party to generate the secret shares $\sigma_i$ that are transmitted to the trustee systems, along with any other relevant meta-information. Alternatively, a particular secret sharing scheme may be mandated by the system or method itself.

The message 111 may also comprise an identifier associated with the first party such that the third party is able to determine the identity of the first party from the message. Alternatively, the message 111 may be sent over a communication channel to the third party that necessarily identifies the first party to the third party, or may be posted to the ledger 104, which is described in more detail below.

The message 111 is transmitted over a secure communication channel, e.g. in order to ensure that the message 111 is not tampered with in transit, and to ensure that only the designated third party (and the first party) has access to the first validation key $\beta$. This ensures that other than the first party system 101 itself only the third party system 103 can create a valid request message 113 for the secret shares $\sigma_i$, as described in more detail below.

Where the secret p corresponds to a password or encryption key, the message 111 may also contain data that have been encrypted according to the secret p, an indication of where an account can be accessed using secret p, and/or any other indication of where further data secured by secret p can be obtained. Indeed, it will be appreciated that the ability to add meta-information about the secret p is not limited to the case where p corresponds to a password or an encryption key. For example, the first party may wish to have the third party understand that the secret relates to business accounts of one business and not another etc.

At step 204, the first party system 101 generates a plurality of secret shares $\sigma_i$ in a k, n secret sharing scheme, as described above with respect to FIG. 1, such that each secret share $\sigma_i$ includes an element of the second object key $\gamma^*$, i.e. the key that can be used to decrypt the encrypted secret $\gamma(p)$. As also mentioned above, the second object key $\gamma^*$ may be encrypted using the third party's public key, $\alpha_{3P}^*$, or the second validation key $\beta^*$, which is provided to the trustee system before being split into the secret shares $\sigma_i$ by the first party system 101. Alternatively, the secret shares $\sigma_i$ themselves can be encrypted, using the second validation key $\beta^*$ or the third party's public key $\alpha_{3P}^*$, as explained above. Where the third party's public key $\alpha_{3P}^*$ is used to encrypt either the second object key $\gamma^*$ or the secret shares $\sigma_i$, the third party's private key $\alpha_{3P}$, which can be used to decrypt the second object key $\gamma^*$ or the secret shares $\sigma_i$, is held securely by the third party system 103. This ensures that only the third party can access the second object key $\gamma^*$ from the reassembled secret shares $\sigma_i$.

The secret shares $\sigma_i$ may also include an identifier associated with the third party, such as a hash of the third party's public key $\#(\alpha_{3P}^*)$, which can be used to identify the third party from the reassembled secret shares $\sigma_i$. The third party's public key $\alpha_{3P}^*$ and/or a hash of the public key $\#(\alpha_{3P}^*)$ may be publicly associated with the third party, for example via a key server, in order to identify the third party. In this way, the third party is held publicly accountable for their requests for OLSKE access. It will be appreciated that where the secret shares $\sigma_i$, rather than the second object key $\gamma^*$, are encrypted using the second validation key $\beta^*$ or the third party's public key $\alpha_{3P}^*$, only the designated third party will be able to decrypt the secret shares $\sigma_i$ in order to reassemble the secret shares $\sigma_i$ to reveal the second object key $\gamma^*$. Thus, the identifier associated with the third party is not included in the secret shares $\sigma_i$ in this scenario.

At step 205, the first party 101 chooses n trustee systems 102a, 102c, 102d from among the available trustee systems 102 to hold a single secret share $\sigma_i$ each. The n trustee systems chosen by the first party may be selected randomly, or deliberately chosen for any reason, such as for financial reasons (e.g. lower charges for providing the trustee service) or legal reasons (e.g. mandated by governments or differences in local data protection legislation).

As explained above, at least k of the n secret shares $\sigma_i$ must be known in order for the content of the secret shares $\sigma_i$, i.e. the encrypted second object key, i.e. $\alpha_{3P}^*(\gamma^*)$ or $\beta^*(\gamma^*)$, and optionally the identity of the third party $\#(\alpha_{3P})$, to be revealed. The first party system 101 securely transmits a message $(\beta^*, \sigma_i)$ 112 including the second validation key $\beta^*$, which is the counterpart of the first validation key $\beta$ transmitted to the third party, and one of the secret shares $\sigma_i$ to each of the n selected trustee systems 102a, 102c, 102d. It will be appreciated that a different secret share $\sigma_i$ is transmitted to each of the trustee systems 102a, 102c, 102d. Each of the n selected trustee systems 102a, 102c, 102d securely stores the message $(\beta^*, \sigma_i)$ as a record for later use, for example in a database. The messages $(\beta^*, \sigma_i)$ 112 are transmitted over a secure communication channel by the first party system 101 to each of the trustee systems 102a, 102c, 102d to ensure that only the selected trustee systems have access to the second validation key $\beta^*$. This ensures that only a trustee system 102a, 102c, 102d with a secret share $\sigma_i$ provided by the first party system 101 can post a valid response message 114, as described in more detail below.

It will be noted that the third party does not know which of the participating trustee systems 102 have been selected. This prevents the third party from colluding with the trustee systems 102a, 102c, 102d in order to obtain access to the second object key $\gamma^*$ by circumventing the present system. Furthermore, encrypting the second object key $\gamma^*$ using the third party's public key $\alpha_{3P}^*$, ensures that even when the secret shares $\sigma_i$ have been re-assembled to reveal the encrypted second object key, i.e. $\alpha_{3P}^*(\gamma^*)$ or $\beta^*(\gamma^*)$, only the third party (or only the third party and the first party, when the second validation key $\beta^*$ is used to encrypt the second object key $\gamma^*$) can obtain the second object key $\gamma^*$ from the secret shares $\sigma_i$. This enables the secret shares $\sigma_i$ to be published to a publicly accessible ledger without compromising the security of the second object key $\gamma^*$ or the secret p, even if the message including the encrypted secret $\gamma(p)$ were also published publicly or otherwise compromised. Furthermore, encrypting the second object key $\gamma^*$ using the third party's public key $\alpha_{3P}^*$ or the second validation key $\beta^*$, or encrypting the secret shares $\sigma_i$ using the second validation key $\beta^*$, prevents the second object key $\gamma^*$ from being compromised by collusion of the trustee systems or a Sybil attack aimed at compromising the system as a whole.

It will be appreciated that the order in which steps 202/203 and 204/205 are carried out is not important, since it is unlikely that the third party will immediately request access to the second object key $\gamma^*$ after receiving the message 111 from the first party system 101.

When the third party wishes to gain access to second object key $\gamma^*$ in order to access the secret p, the third party system 103 creates a request message 113, as described above. The request message 113 includes an arbitrary token T and $\beta(T)$, a copy of the same token T that has been encrypted using the first validation key $\beta$ of the validation key pair $\beta$, $\beta^*$ that is securely held by the third party system 103. As explained above, a copy of the second validation key $\beta^*$ is held by each of the trustee systems 102a, 102c, 102d that were selected by the first party to hold the secret shares $\sigma_i$.

Request messages 113 are published to a ledger 104a, which is at least accessible by the trustee systems 102 and the first party system 101. At step 206, each trustee system 102 monitors the ledger 104a on an ongoing basis for request messages 113 that correspond to secret shares $\sigma_i$ held by the trustee system. At step 207, the third party system 103 publishes the request message 113 to a ledger 104a, which is at least accessible by the trustee systems 102 and the first party system 101.

It will be appreciated that each trustee system 102 may maintain a large number of records, each comprising a different validation key and secret share that has been transmitted to the trustee system 102 from various first parties. Thus, as part of the monitoring process of step 206, each trustee system attempts to validate the request messages published to the ledger in order to determine whether each request published to the ledger 104a is a request for a secret share that the given trustee system 102 holds. For each record held by the trustee system 102, the trustee system 102 attempts to decrypt the encrypted token $\beta(T)$ of the request message using the validation key held in that record, i.e. performing the operation $\beta^*(\beta(T))$. The output of the operation $\beta^*(\beta(T))$ is then compared with the unencrypted token T of the request message. If the second validation key $\beta^*$ held in the given record is the counterpart of the first validation key $\beta$ that was used by the third party to encrypt the token T when generating the request message 113, then the decrypted token $\beta^*(\beta(T))$ will be identical to the unencrypted token T of the request message. In this way, each trustee system 102 is able to determine whether a record that it holds is associated with the request published to the ledger 104a by the third party system 103. If the decrypted token does not match the unencrypted token, the trustee system 102 moves onto and tests the validation key of the next record against the encrypted and unencrypted tokens provided in the request message. If the decrypted token does match the unencrypted token, i.e. the message is validated at step 208 of the method 200, the trustee system 102 publishes the secret share $\sigma_i$ held in the relevant record matching the request message 113 at step 210 of the method 200.

It will also be appreciated that the validation process employed by the trustee systems 102 may be employed by the first party system 101 in order to determine that the third party system 103 is attempting to access the second object key $\gamma^*$ and thus the secret p. Unlike a trustee system, whose token validation step only reveals the identity of the first party from which the second validation key $\beta^*$ was received, the first party may retain a record of the association of the validation key pair $\beta$, $\beta^*$ with the third party. As such, by attempting to decrypt the encrypted token $\beta(T)$ of the request message using the second validation key held $\beta^*$ that is still held by the first party system 101 and comparing the result to the unencrypted token T, the first party system 101 can determine that a request was published by the third party system 103 to which it sent the first validation key $\beta$.

After publishing anonymously the request message 113 at step 207 to the ledger 104a, the third party system 103 monitors the ledger 104b for a response message 114 at step 209. The third party system uses validation means contained in the response messages 114 to determine whether each response message 114 is associated with the request message 113, as described below.

At step 210, when a trustee system 102 determines a match between a request message 113 and record held by that trustee system, as described above, the trustee system publishes a response message 114, which includes the secret share $\sigma_i$, to a ledger 104b. If the secret shares $\sigma_i$ were not encrypted using the second validation key $\beta^*$ by the first party system 101 prior to providing the secret shares to the trustee systems 102, then the secret share $\sigma_i$ that is published in the response message 114 may be further encrypted by the trustee system using the second validation key $\beta^*$ that is held by the trustee system 102. In this way, only the third party is able to decrypt the secret shares $\sigma_i$ in order to reveal the (encrypted) second object key $\gamma^*$.

The ledger 104b to which the response message 114 is published may be the same ledger as the ledger 104a to which the request message 113 was posted. Alternatively, the ledger 104b to which the response message 114 is published may be a different ledger, as long as the ledger 104b is accessible to the third party system 103—in order to retrieve the secret shares $\sigma_i$—and accessible to the first party system 101—in order to determine that the secret shares $\sigma_i$ have been published. When publishing the response message 114, the trustee system 102 may also notify the first party system 101, if the identity of the first party is known to the trustee systems 102.

It will be appreciated that until at least k of the n response messages 114 have been published and the secret shares $\sigma_i$ contained therein have been reassembled, the trustee systems 102 cannot know the identity of the third party, even if the trustee systems 102 know the secret sharing scheme that has been used, since the third party's identifier $\#(\alpha_{3P}^*)$ may also be part of the secret shares $\sigma_i$. Indeed, by validating the request messages using the validation key pair $\beta$, $\beta^*$, the trustee systems 102 are able to identify and validate the messages posted to the ledger without requiring knowledge of the third party's true identity. This prevents the trustee systems 102 from discriminating against a third party, for any reason, and ensures consistent processing of each of the request messages and records.

In an alternative arrangement, the trustee systems 102 may indeed be aware of the identity of the third party, or may at least be aware of a public key $\alpha_{3P}^*$, or a hash of it $\#(\alpha_{3P}^*)$, associated with the third party. The first party system 101 may transmit the whole public key associated with the third party, or a hash thereof, to the trustee systems 102 as part of or along with message 112. This arrangement enables the trustee systems to require that the identity of the third party has not changed since the first party transmitted the message 112 to the trustee systems 102, for example by requiring that a request message 113 published by the third party is validly signed using the third party's private key $\alpha_{3P}$, for example by encrypting a hash of the request message and transmitting the encrypted hash along with the request message 113. In this arrangement, when publishing the response message 114, each trustee system 102 may also publish the whole public key or other identifier associated with the third party.

As mentioned above, the response message 114 posted by each trustee system comprises at least the secret share $\sigma_i$ held by the trustee system and the validation means that enables the third party system 103 to identify and validate response messages 114 that are associated with the third party system's 103 request message 113. To this end, the validation means may also include an encrypted version of the secret share $\beta^*(\sigma_i)$, or an encrypted hash of the secret share $\beta^*(\#(\sigma_i))$. At step 211, the third party system 103 both determines that the response message 114 is associated with its request message 113 and validates that the trustee system 102 holds the second validation key $\beta^*$ by comparing the result of the operation $\beta(\beta^*(\sigma_i))$ with the secret share $\sigma_i$, or the operation $\beta(\beta^*(\#(\sigma_i)))$ with a hash of the secret share $\#(\sigma_i)$. If the result of the operation matches the secret share $\sigma_i$ or hash of the secret share $\#(\sigma_i)$, the third party can be sure that the trustee system 102 that published the response message 114 holds the second validation key $\beta^*$ that is the counterpart of the first validation key $\beta$ held by the third party system 103, and that the response message 114 was legitimately published in response to the third party system's request message 113. Of course, where a hash of the secret share $\#(\sigma_i)$ is used, the same hash function must be used by both the trustee system 102 and the third party system 103 to generate the hash. The specific hash function, e.g. MD5 or SHA-1/2/3, is therefore pre-agreed, e.g. as part of the protocol specification, or alternatively may be specified in the response message.

As an alternative to using the secret share $\sigma_i$ or a hash thereof as a token to validate the response message 114, the response message 114 may instead comprise a second arbitrary token V and an encrypted version of the second token $\beta^*(V)$. These are then used by the third party system 103 to validate the response message by comparing the result of the operation $\beta(\beta^*(V))$ with the unencrypted token V, in a similar manner to the token T and encrypted token $\beta(T)$ discussed above with respect to validation of the request message 113. The token V used by a given trustee system 102 in its response message is a unique token, i.e. different to other tokens V used by other trustee systems 102 in their response messages. For example, the token V could be a hash of a public key associated with the individual trustee system 102, i.e. $\#(\alpha_{TS}^*)$. By using the secret share $\sigma_i$, a hash of the secret share $\#(\sigma_i)$, or a unique token V, the present system and method prevent spoofing of response messages by trustee systems 102, or other actors with access to the ledger, who do not have access to the second validation key $\beta^*$.

Alternatively, both tokens T and V, used to validate the request and response messages respectively, may be replaced by a single token W that is generated by the first party system 101 and transmitted securely to the third party system 103 along with the encrypted secret p and first validation key $\beta$, and transmitted securely to the selected trustee system 102 along with the secret shares and the second validation key $\beta^*$. Each trustee system 102 is then configured to compare the token W received in the request message 113 with its own copy of the token W in order to determine that the request message 113 corresponds to the secret share that the trustee system holds. The validation keys $\beta$, $\beta^*$ are used in the same manner as described above to validate the request, i.e. to determine that the entity that posted the request message holds the relevant first validation key $\beta$, and was therefore designated by the first party. Similarly, the third party system 103 is then configured to compare the token W in the response message 114 with its own copy of the token W in order to determine that the response message 114 corresponds to its request.

Alternatively, the third party system can be configured to restrict the validation means of the request message 113 to comprise only the encrypted token $\beta(W)$, using the first validation key $\beta$, rather than including the unencrypted token W too. Each trustee system is then configured to compare the decryption of such encrypted token, using the second validation key $\beta^*$, to the token W stored securely in its memory and in this way determine that the request message 113 corresponds to the secret share that the trustee systems holds and at the same time validate that the request message 113 had been posted by the designated first party.

When the system is used by many first parties, the probability of duplicate validation keys being generated for different secrets p increases (similarly to the phenomenon observed in the so-called birthday problem). If duplicate validation keys are in use, a request message published for a first secret may also solicit responses related to a second secret, and vice versa. The use of the single token W reduces the probability of duplicate validation keys $\beta$, $\beta^*$ causing incorrect response messages 114 to be published, since both the validation keys $\beta$, $\beta^*$ and the token W must be duplicated in order for this collision to occur.

The request message 113 published by the third party system 103 may also include an identifier that is to be published with each response message 114 in order for other parties to determine which response messages are related and hence which of the published secret shares $\sigma_i$ are related. Alternatively, the request message and 113 and related response messages 114 may be identifiable through the layout configuration of the ledger, e.g. by forcing the messages to be bundled together on the ledger. In this way, any interested party with access to the ledger 104b can reassemble the published secret shares $\sigma_i$, assuming that the secret sharing scheme is generally known, to reveal the identity of the third party $\#(\alpha_{3P})$ without requiring access to the validation keys $\beta$, $\beta^*$. If the ledger 104b is publicly accessible, this arrangement makes the actions of the third party publicly accountable. Alternatively, the identity of the requesting third party may be revealed, i.e. not as part of the secret share $\sigma_i$, with every response message 114, for example by including the third party's identity hash within the response message 114. Doing so, however, would allow trustee systems to discriminate against request messages to process based on the requesting party. While this is generally not preferable, it may be advantageous in scenarios where complete transparency is required.

After publishing the response message 114, each trustee system may optionally mark the record comprising the published secret share $\sigma_i$ as closed, or may even delete the record. This reduces the computational burden on the trustee systems 102 of validating future request messages 113 since old records that have already been published will be excluded from the validation process set out above.

It will be appreciated that steps 206, 208 and 210, as well as the additional functions of the trustee systems described above, will generally be carried out individually by each of the trustee systems.

At step 211, once at least k out of the n trustee systems 102 have published response messages 114 and the response messages 114 have been validated and obtained by the third party system 113, the third party system 103 reassembles the secret shares $\sigma_i$ to reveal the encrypted second object key, i.e. $\alpha_{3P}^*(\gamma^*)$ or $\beta^*(\gamma^*)$. If the second object key $\gamma^*$ was encrypted using the third party's public key $\alpha_{3P}^*$, the third party system 103 uses its private key $\alpha_{3P}$ to obtain the second object key $\gamma^*$ after obtaining the encrypted second object key $\alpha_{3P}^*(\gamma^*)$ from the published secret shares $\sigma_i$ of the response messages. If the second object key $\gamma^*$ or the secret shares $\sigma_i$ were encrypted using the second validation key $\beta^*$, the third party system 103 uses the first validation key $\beta$ to decrypt the second object key $\gamma^*$ or the secret shares $\sigma_i$ at the appropriate time. The third party system 103 then uses the revealed second object key $\gamma^*$ to decrypt the encrypted secret $\gamma(p)$, which it previously received from the first party system 101.

Furthermore, once a sufficient number, i.e. k out of n, of response messages 114 has been published to the ledger 104b, the third party may close the original request message 113 or post a further message to the ledger 104a/104b to indicate that the request message 113 is closed. In this way, the trustee systems 102 know not to attempt to validate the closed request message in future, thereby reducing the computational burden of the validation process.

Alternatively, the system can mandate that response messages 114 needs to be posted within a set time period or within a particular number of 'blocks' on the ledger. If the time period expires with an insufficient number of published responses, i.e. fewer than k out of n, the third party will need to publish a further request message 113. In this manner, there is an incentive for responses to published in a timely manner, since any given trustee system can determine that other trustee systems (but fewer than k) have published responses to the request and may therefore post their secret share $\sigma_i$ within the time limit in order to avoid wasted work or financial disincentives.

As mentioned above, the ledger(s) 104a, 104b can be checked at any time by the first party system 101, or indeed may be monitored continuously by the first party system 101. The first party system can use the validation key pair $\beta$, $\beta^*$ to verify the legitimacy of any published request messages 113 for OLSKE access. Alternatively, or in addition, any trustee system 102 may inform or notify the first party system 101 of request messages 113 once they have been validated using the second validation key $\beta^*$ held by the trustee system 102. Since the first party system 101 retains the association between the validation key pair $\beta$, $\beta^*$ and the identity of the third party to whom the first party has provided OLSKE access, the first party can deduce the identity of the third party from the request message 113, assuming the request message 113 is valid.

Furthermore, where the second validation key $\beta^*$ is used to encrypt the second object key $\gamma^*$ or the secret shares $\sigma_i$, the first party system 101 may also publish a request message to the ledger 104a in order to obtain the second object key $\gamma^*$ as long as the first party system 101 retains the first validation key $\beta$ after transmitting it to the third party system 103. In this manner, the first party system 101 may be able to recover access to the secret p in the event that its original copy of p was lost. If the secret p itself is encrypted and split into the secret shares $\sigma_i$ that were transmitted to the trustee systems 102, the first party system 101 need only retain the first validation key $\beta$ in order to recover the secret. If the second object key $\gamma^*$ is encrypted and split into the secret shares $\sigma_i$ then the first party system 101 must also retain a copy of the encrypted secret $\gamma(p)$. Thus, the present system may also function as a recovery mechanism for passwords or other secrets p. Indeed, when the system is used as such, the third party system 103 need not be present.

In another embodiment of a secret recovery mechanism, the secret p is either encrypted using a public key $\alpha_{1P}^*$ associated with the first party, or directly split into secret shares which are encrypted using the public key $\alpha_{1P}^*$ associated with the first party. The secret shares are then transmitted securely to the trustee systems, along with a token Y. The trustee systems may either receive a copy of the first party's public key $\alpha_{1P}^*$, or the public key $\alpha_{1P}^*$ may be retrieved from a key server for storage with the secret share. When the first party wishes to recover the secret p, the first party publishes a request message to ledger comprising the encrypted version of the token $\alpha_{1P}(Y)$, which was encrypted with the first party's private key. The validation method outlined above may then be performed with the necessary changes to use the first party's public key $\alpha_{1P}^*$ rather than the second validation key $\beta^*$. The first party can retrieve the secret shares published in response to the request message and decrypt the secret or secret shares using their private key $\alpha_{1P}$. This arrangement, using the first party's public and private keys, means that the first party needs only to retain access to their private key $\alpha_{1P}$ in order to recover the secret.

Should the first party wish to revoke the OLSKE access that has been provided to the third party at any time, the first party system 101 sends messages to each of the trustee systems 102 instructing the trustee systems 102 to delete the secret shares $\sigma_i$ that they each hold. If the first party system 101 were also to concurrently send a delete message to the third party system 103, the third party may attempt to immediately retrieve the second object key $\gamma^*$ from the trustee systems 102. If, for any reason, the third party's request were processed before the first party's delete message, then the third party may be able to gain unauthorised (albeit still overt) access to the second object key $\gamma^*$. Thus, the trustee systems 102 may transmit a confirmation message to the first party system 101 to indicate that the secret shares $\sigma_i$ have been deleted. Once n−k+1 confirmations have been received by the first party 101 from the trustee systems 102, i.e. as soon as there are no longer enough secret shares $\sigma_i$ held by trustee systems 102 for any party to reassemble the second object key $\gamma^*$, the first party system 101 may also forward the delete message to the third party system. Alternatively, where the secret p is a password or key for accessing further data, the first party may simply change p in order to prevent the third party from accessing the further data.

In order to prevent flooding of ledger(s) 104*a*, 104*b* with opportunistic or bogus request messages 113 and response messages 114, a computational or financial burden may be imposed upon the posting of a message to the ledger. For example, in order to post a message to the ledger, a trustee system 102 or third party 103 may be required to calculate a hash of existing messages in a block, for example in a blockchain. An example of a blockchain is described in "*Bitcoin: A Peer-to-Peer Electronic Cash System*", S. Nakamoto <https://bitcoin.org/bitcoin.pdf> or in "*A Next Generation Smart Contract & Decentralized Application Platform*", V. Buterin, <http://www.the-blockchain.com/docs/Ethereum_white_paper-a_nextgeneration_smart_contract_and_decentralized_application_platform-vitalik-buterin.pdf>. Of course, other forms of distributed ledgers may be used, for example a consensus ledger, as described in "*The Ripple Protocol Consensus Algorithm*", D. Schwartz, N. Youngs, A. Britto, <https://prod.coss.io/documents/white-papers/ripple.pdf>, a directed acyclic graph, as described in "*The Tangle*", S. Popov, <https://iota.org/IOTA_Whitepaper.pdf>.

In order for OLSKE access to function effectively, the first party much be sufficiently confident that that the third party—or indeed anyone else—cannot gain access to the secret p unless the third party requests such access in a manner that is knowable to the first party as a matter of public record. If the second object key $\gamma^*$ were entrusted to a single trustee system, it would be relatively straightforward for the third party to put undue private pressure on the operator of the trustee system to reveal the second object key $\gamma^*$ surreptitiously, i.e. without the first party's knowledge. Indeed, this is a general problem with cryptographic protocols which rely on trusted parties to provide security, such as certificate authorities that issue digital certificates for use in HTTP Secure. As explained above, in the system or method of the present invention, the third party would have to identify and then successfully pressure the operators of at least k out of the n chosen trustee systems 102*a*, 102*b*, 102*c* in order to obtain the second object key $\gamma^*$ without the first party's knowledge. The larger the number of available trustee systems 102 from which the first party can freely select n trustee system 102*a*, 102*c*, 102*d* to hold the secret shares $\sigma_i$, and the larger the numbers n and k, the more difficult it is for the third party to successfully pressure the trustee systems into revealing a sufficient number, i.e. k, secret shares $\sigma_i$ outside of the system. The decentralised system described herein therefore forces the third party to use the ledger system 104*a*, 104*b* in order to gain access to the second object key $\gamma^*$ in a way which enables the first party to know if and when access to the second object key $\gamma^*$ has been requested. Furthermore, using a secret sharing scheme to securely decentralise the storage of the second object key $\gamma^*$ avoids the creation of obvious honeypots for malicious third parties to attack in an attempt to gain access to the object keys that centralised storage of the object keys would entail.

Through the description, an asterisk * has been used to denote the one key out of a pair of complementary asymmetric encryption keys. While the keys referred to as "public" keys in the present disclosure have been presented with an asterisk, it should be noted that a key denoted by an asterisk is not necessarily published or otherwise publicly available, as the term "public key" would usually connote, and may indeed be held securely and in secret by any parties that hold or receive the key unless otherwise stated. Indeed, the object key pair $\gamma$, $\gamma^*$ and the validation key pair $\beta$, $\beta^*$ are not used in the conventional public/private manner that is generally associated with asymmetric encryption keys, but are instead provided by the first party system 101 to the trustee systems 102 and third party 103 to control access to the secret p and to allow the trustee systems 102 and third party 103 to validate messages published by each other. Furthermore, it will be appreciated that, mathematically speaking, there is generally no hard distinction between a public key and a private key beyond which is held in secret and which is made available to third parties—either key in a key pair can be used to encrypt data, while the other key can decrypt the data. As such, in the context of the object, validation and request keys, the designation of one key with an asterisk and the other without should be considered to be an arbitrary choice, and the alternate designation could just as easily be used without altering the actual features of the underlying system.

The following is a list of embodiments that may or may not be claimed:

1. A system for providing to a designated third party system access to a secret, the system comprising:
   a plurality of trustee systems, wherein each trustee system is configured to:
   receive a secret share of the secret from a first party system and store the secret share, wherein the secret or the secret share is encrypted such that only a designated third party system can access the secret;
   monitor published requests for the secret shares;
   validate that a request for the secret shares was made by the designated third party system; and
   if the validation is successful, publish the secret share in response to the validated request for the secret shares.

2. The system of embodiment 1, wherein the request for the secret shares comprises a validation token and an encrypted validation token, and wherein each trustee system is further configured to:
   receive a second key of a validation key pair from the first party system along with the secret share and store the second key of the validation key pair;
   validate that the request for the secret shares was made by the designated third party system by decrypting the encrypted validation token using the second key of the validation key pair and comparing the decrypted validation token with the validation token; and
   if the validation token of the validation message matches the decrypted validation token, publish the associated secret share.

3. The system of embodiment 1, wherein the request for the secret shares comprises an encrypted validation token, and wherein each trustee system is further configured to:
   receive a second key of a validation key pair from the first party system along with the secret share and store the second key of the validation key pair;
   receive a validation token from the first party system and store the validation token;
   validate that the request for the secret shares was made by the designated third party system by decrypting the encrypted validation token using the second key of the validation key pair and comparing the decrypted validation token with the validation token that was received from the first party system.

4. The system of any preceding embodiment, wherein each secret share further comprises a share of an identifier associated with the third party system such that the identifier can be derived from the secret shares.
5. The system of any one of embodiments 1 to 3, wherein each trustee system is further configured:
   to receive an identifier associated with the third party system from the first party system along with the secret share; and
   publish the identifier associated with the third party system along with the secret share.
6. The system of embodiment 5, wherein each trustee system is further configured to verify that the identity of the third party system has not changed since the plurality of secret shares were generated.
7. The system of any one of embodiments 4 to 6, wherein the identifier associated with the third party system comprises a public key fingerprint or hash of the public key associated with the third party system.
8. The system of any preceding embodiment, wherein each trustee system is further configured to notify the first party system when publishing its secret share.
9. The system of any preceding embodiment, further comprising a first party system, wherein the first party system is configured to:
   encrypt the secret;
   generate the secret shares of the encrypted secret; and
   transmit the secret shares to the plurality of trustee systems.
10. The system of any one of embodiments 1 to 8, further comprising a first party system, wherein the first party system is configured to:
    generate the secret shares of the secret;
    encrypt the secret shares; and
    transmit the encrypted secret shares to the plurality of trustee systems.
11. The system of embodiment 9 or 10, wherein the first party system is configured to encrypt the secret or secret shares using a public encryption key associated with the third party system.
12. The system of embodiment 9 or embodiment 10, wherein the first party system is further configured to transmit to the third party system the key required to decrypt the encrypted secret shares or encrypted secret shares.
13. The system of embodiment 12, when dependent on embodiment 2 or 3, wherein the first party system is configured to encrypt the secret or secret shares using the second validation key of the validation key pair, and wherein the key required to decrypt the encrypted secret or encrypted secret shares is the first validation key of the validation key pair.
14. The system of any one of embodiments 9 to 13, wherein the secret is a second object key of an object key pair, and wherein the first party system is further configured to:
    encrypt data using the first object key of the object key pair; and
    transmit the encrypted data to the third party system;
15. The system of any one of embodiments 9 to 14, when dependent on embodiment 3, wherein the first party system is further configured to:
    generate a validation token;
    transmit the validation token to the plurality of trustee systems; and
    transmit the validation token to the third party system.
16. The system of any one of embodiments 9 to 15, when dependent on embodiment 4, wherein the first party system is further configured to:
    monitor the plurality of published secret shares from the plurality of trustee systems; and
    reassemble the published secret shares to reveal the identifier associated with the third party system.
17. The system of any one of embodiments 9 to 16, wherein the first party system is further configured to select the plurality of trustee systems from a group of available trustee systems, wherein the plurality of trustee systems is a subset of the group of available trustee systems.
18. The system of any preceding embodiment, wherein the secret shares are part of a (k, n) secret sharing scheme, each secret share comprising a share of the secret or the encrypted secret such that a subset of k secret shares of the n total secret shares can be used to derive the secret or the encrypted secret.
19. The system of embodiments 17 and 18, wherein the selected plurality of trustee systems comprises n trustee systems.
20. The system of any one of embodiments 9 to 19, when dependent on one or more of embodiments 2, 3 or 13, wherein the first party system is further configured to transmit the second key of the validation key pair to each of the plurality of trustee systems and to transmit the first key of the validation key pair to the third party system.
21. The system of any one of embodiments 9 to 20, when dependent on embodiment 2, wherein the first party system is further configured to:
    analyse a published request for secret shares by decrypting the encrypted validation token using the second key of the validation key pair and comparing the decrypted validation token with the validation token; and
    if the validation token of the validation message matches the decrypted validation token, determine that the request for the secret shares was published by the designated third party system.
22. The system of any one of embodiments 9 to 20, when dependent on embodiment 3, wherein the first party system is further configured to:
    analyse the request for secret shares by decrypting the encrypted validation token using the second key of the validation key pair and comparing the decrypted validation token with the validation token held by the first party system; and
    if the validation token held by the first party system matches the decrypted validation token, determine that the request for the secret shares was published by the designated third party system.
23. The system of any preceding embodiment, further comprising a third party system, wherein the third party system is configured to:
    publish the request for the secret shares;
    monitor the plurality of published secret shares;
    validate the secret shares published by the plurality of trustee systems in response to the request for the secret shares;
    reassemble the encrypted secret from the published secret shares; and
    decrypt the encrypted secret.
24. The system of any one of embodiments 1 to 22, further comprising a third party system, wherein the third party system is configured to:

publish the request for the secret shares;
monitor the plurality of published secret shares;
validate the secret shares published by the plurality of trustee systems in response to the request for the secret shares;
decrypt the encrypted secret shares from the published secret shares; and
reassemble the secret from the decrypted secret shares.

25. The system of embodiment 23 or 24, when dependent on embodiment 11, wherein the third party system is further configured to decrypt the encrypted secret using the private key of the key pair associated with the third party system.

26. The system of embodiment 23 or 24, when dependent on embodiment 12 or 13, wherein the third party system is further configured to:
receive the key required to decrypt the encrypted secret or encrypted secret shares from the first party system; and
decrypt the encrypted secret using the key required to decrypt the encrypted secret or encrypted secret shares received from the first party.

27. The system of any one of embodiments 23 to 26, when dependent on embodiment 14, wherein the third party system is further configured to:
receive the encrypted data from the first party system;
decrypt the encrypted data using the decrypted second object key of the object key pair.

28. The system of any one of embodiments 23 to 27, when dependent on embodiment 15, wherein the third party system is further configured to validate the secret shares published in response to the request for the secret shares by comparing the decrypted second validation token published with the secret shares to a local copy of the second validation token, such that when the decrypted second validation token matches the local copy of the second validation token, the third party system retrieves the associated secret share.

29. The system of any one of embodiments 23 to 27, wherein each trustee system is further configured to:
generate a second validation token;
encrypt the second validation token using the second validation key of the validation key pair to generate an encrypted second validation token; and
publish the second validation token and the encrypted second validation token with the secret share;
and wherein third party system is further configured to:
validate the secret shares published in response to the request for the secret shares by:
decrypting the encrypted second validation token using the first validation key of the validation key pair;
comparing the decrypted second validation token with the second validation token; and
retrieving the associated secret share when the decrypted second validation token matches the second validation token.

30. The system of embodiment 29, wherein the second validation token is a hash of the secret share, a hash of a public key associated with the trustee system, or a unique identifier.

31. The system of any preceding embodiment, wherein communications between the first party system and the plurality of trustee systems and/or communications between the first party system and the third party system are carried out over a secure communication channel.

32. The system of any preceding embodiment, wherein the secret shares are published by the plurality of trustee systems to a first ledger.

33. The system of any preceding embodiment, wherein the requests for the secret shares are published to the first ledger, or to a second ledger.

34. The system of embodiment 32 or 33, wherein the ledger is a blockchain, directed acyclic graph, or a consensus ledger.

35. The system of any one of embodiments 32 to 34, wherein the ledger is publicly accessible.

35. A method for providing to a designated third party system access to a secret, the method comprising:
receiving, at a trustee system, a secret share of the secret from a first party system and storing the secret share, wherein the secret or the secret share is encrypted such that only a designated third party system can access the secret;
monitoring published requests for the secret shares;
validating that a request for the secret shares was made by the designated third party system; and
if the validation is successful, publishing the secret share in response to the validated request for the secret shares.

36. A computer-readable medium comprising instructions which, when executed by a computer, cause the computer to carry out the method of embodiment 36.

The invention claimed is:

1. A system for providing to a designated third party system access to a secret, the system comprising:
a plurality of trustee systems, wherein each trustee system is configured to:
receive, by the trustee system, a secret share of the secret from a first party system and store, by the trustee system, the secret share, wherein the secret or the secret share has been encrypted by the first party system prior to reception by the trustee system, such that only a designated third party system can access the secret;
monitor, by the trustee system, a first ledger for a published request for the secret share, the request originating from the designated third party system;
validate, by the trustee system, that the monitored, published request for the secret share was made by the designated third party system; and
if the trustee system successfully validates that the monitored, published request for the secret share was made by the designated third party system, publish, by the trustee system, the secret share to the first ledger, or to a second ledger, the publishing of the secret share being in response to the successfully validated request for the secret share and such that the designated third party system's access to the secret is necessarily visible from the publication of the secret share to the first ledger, or to the second ledger.

2. The system of claim 1, wherein the request for the secret share comprises a validation token and an encrypted validation token, and wherein each trustee system is further configured to:
receive a second key of a validation key pair from the first party system along with the secret share and store the second key of the validation key pair;
validate that the request for the secret share was made by the designated third party system by decrypting the encrypted validation token using the second key of the validation key pair and comparing the decrypted validation token with the validation token; and if the validation token of a validation message matches the decrypted validation token, publish the associated secret share.

3. The system of claim 2, further comprising the first party system, wherein the first party system is configured to encrypt the secret or secret share using the second validation key of the validation key pair, and wherein the key required to decrypt the secret or secret share is the first validation key of the validation key pair.

4. The system of claim 2, further comprising a first party system, wherein the first party system is further configured to:

analyse a published request for the secret share by decrypting the encrypted validation token using the second key of the validation key pair and comparing the decrypted validation token with the validation token; and if the validation token of the validation message matches the decrypted validation token, determine that the request for the secret share was published by the designated third party system.

5. The system of claim 1, wherein the request for the secret share comprises an encrypted validation token, and wherein each trustee system is further configured to:

receive a second key of a validation key pair from the first party system along with the secret share and store the second key of the validation key pair;

receive a validation token from the first party system and store the validation token;

validate that the request for the secret share was made by the designated third party system by decrypting the encrypted validation token using the second key of the validation key pair and comparing the decrypted validation token with the validation token that was received from the first party system.

6. The system of claim 5, further comprising a first party system, wherein the first party system is further configured to:

generate a validation token;

transmit the validation token to the plurality of trustee systems; and transmit the validation token to the third party system.

7. The system of claim 6, further comprising a third party system, wherein the third party system is further configured to validate the secret shares published in response to the request for the secret share by comparing the decrypted second validation token published with the secret shares to a local copy of the second validation token, such that when the decrypted second validation token matches the local copy of the second validation token, the third party system retrieves the associated secret share.

8. The system of claim 5, further comprising a first party system, wherein the first party system is further configured to:

analyse the request for the secret share by decrypting the encrypted validation token using the second key of the validation key pair and comparing the decrypted validation token with the validation token held by the first party system; and if the validation token held by the first party system matches the decrypted validation token, determine that the request for the secret share was published by the designated third party system.

9. The system of claim 1, wherein each secret share further comprises a share of an identifier associated with the third party system such that the identifier can be derived from the secret share, or wherein each trustee system is further configured:

to receive an identifier associated with the third party system from the first party system along with the secret share; and publish the identifier associated with the third party system along with the secret share.

10. The system of claim 1, further comprising a first party system, wherein the first party system is configured to:

encrypt the secret;

generate the secret shares of the encrypted secret; and transmit a secret share of the secret shares to each of the plurality of trustee systems.

11. The system of claim 10, wherein the first party system is configured to encrypt the secret or secret share using a public encryption key associated with the third party system.

12. The system of claim 10, wherein the secret is a second object key of an object key pair, and wherein the first party system is further configured to:

encrypt data using the first object key of the object key pair; and transmit the encrypted data to the third party system.

13. The system of claim 12, further comprising a third party system, wherein the third party system is further configured to:

receive the encrypted data from the first party system;

decrypt the encrypted data using a decrypted second object key of the object key pair.

14. The system of claim 10, wherein the first party system is further configured to select the plurality of trustee systems from a group of available trustee systems, wherein the plurality of trustee systems is a subset of the group of available trustee systems.

15. The system of claim 1, further comprising a first party system, wherein the first party system is configured to:

generate the secret share of the secret;

encrypt the secret share; and transmit the encrypted secret share to the plurality of trustee systems.

16. The system claim 1, further comprising a third party system, wherein the third party system is configured to:

publish the request for the secret share;

monitor a plurality of published secret shares;

validate the secret shares published by the plurality of trustee systems in response to the request for the secret share;

reassemble the encrypted secret from the published secret shares; and decrypt the encrypted secret.

17. The system of claim 16, wherein the third party system is further configured to decrypt the encrypted secret or secret share using a private key of a key pair associated with the third party system or with a first validation key of a validation key pair.

18. The system of claim 16, wherein each trustee system is further configured to:

generate a second validation token;

encrypt the second validation token using a second validation key of a validation key pair to generate an encrypted second validation token; and publish the second validation token and the encrypted second validation token with the secret share; and wherein third party system is further configured to:

validate the secret shares published in response to the request for the secret share by:

decrypting the encrypted second validation token using the first validation key of the validation key pair;

comparing the decrypted second validation token with the second validation token; and retrieving the associated secret share when the decrypted second validation token matches the second validation token.

19. The system of claim 1, further comprising a third party system, wherein the third party system is configured to:

publish the request for the secret share;

monitor a plurality of published secret shares;

validate the secret shares published by the plurality of trustee systems in response to the request for the secret share;

decrypt the encrypted secret share from the published secret shares; and reassemble the secret from the decrypted secret share.

20. A method for providing to a designated third party system access to a secret, the method comprising:

receiving, by a trustee system, a secret share of the secret from a first party system and storing, by the trustee system, the secret share, wherein the secret or the secret share has been encrypted by the first party system prior to reception by the trustee system, such that only a designated third party system can access the secret;

monitoring, by the trustee system, a first ledger for a published request for the secret share, the request originating from the designated third party system;

validating, by the trustee system, that the monitored, published request for the secret share was made by the designated third party system; and if the trustee system successfully validates that the monitored, published request for the secret share was made by the designated third party system, publishing, by the trustee system, the secret share to the first ledger, or to a second ledger, the publishing, by the trustee system, of the secret share being in response to the successfully validated request for the secret share and such that the designated third party system's access to the secret is necessarily visible from the publication of the secret share to the first ledger, or to the second ledger.

21. A non-transitory computer-readable medium comprising instructions which, when executed by a computer, cause the computer to:

receive, by the trustee system, a secret share of the secret from a first party system and store, by the trustee system, the secret share, wherein the secret or the secret share has been encrypted by the first party system prior to reception by the trustee system, such that only a designated third party system can access the secret;

monitor, by the trustee system, a first ledger for a published request for the secret share, the request originating from the designated third party system;

validate, by the trustee system, that the monitored, published request for the secret share was made by the designated third party system; and if the trustee system successfully validates that the monitored, published request for the secret share was made by the designated third party system, publish, by the trustee system, the secret share to the first ledger, or to a second ledger, the publishing, by the trustee system, of the secret share being in response to the validated request for the secret share and such that the designated third party system's access to the secret is necessarily visible from the publication of the secret share to the first ledger, or to the second ledger.

* * * * *